T. GANNON.
Means of Cooling Water for Evaporating and
Distilling Apparatus.
No. 226,300.                                Patented April 6, 1880.
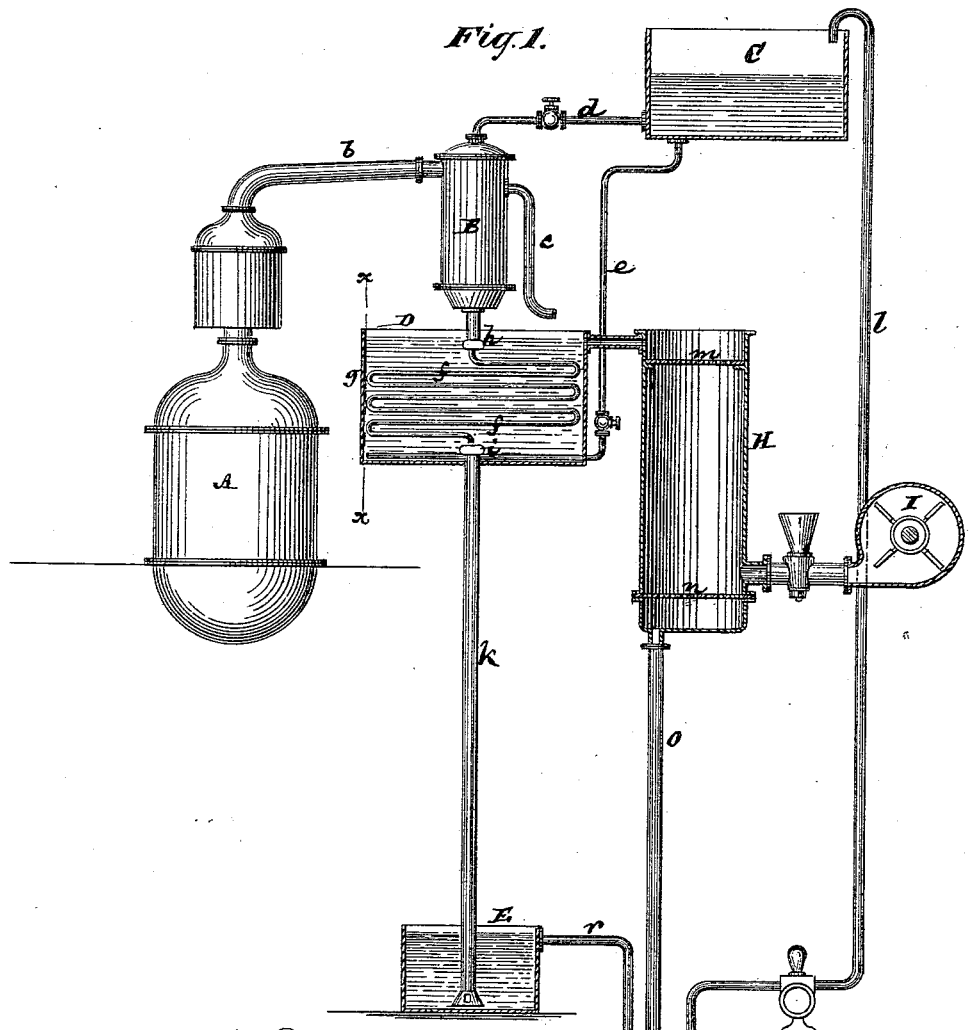

UNITED STATES PATENT OFFICE.

THOMAS GANNON, OF JERSEY CITY, NEW JERSEY.

MEANS OF COOLING WATER FOR EVAPORATING AND DISTILLING APPARATUS.

SPECIFICATION forming part of Letters Patent No. 226,300, dated April 6, 1880.

Application filed June 25, 1879.

*To all whom it may concern:*

Be it known that I, THOMAS GANNON, of Jersey City, in the county of Hudson and State of New Jersey, have invented certain new and useful Improvements in Means of Cooling Water for Evaporating and Distilling Apparatus, of which the following is a description, reference being had to the accompanying drawings, forming part of this specification.

This invention has more particularly for its object the use, in evaporating and distilling apparatus, of the same water over and over again for condensing or cooling without loss or waste, and for keeping the supply-water at a low temperature.

It will be found especially advantageous in the West Indies and other countries or districts where water is scarce.

The invention consists in the combination, with a condenser, of a barometric leg or column, through which the water is discharged from said condenser, and one or more serpentine passages or coiled pipes forming part of said barometric leg or column, and arranged in a vat, tank, or vessel which is supplied with a cooling-fluid.

It also consists in the combination, with a condenser, of a barometric leg or column formed or provided with a series of serpentine passages or coiled pipes for retarding and cooling the water passing down said leg or column.

In the accompanying drawings, Figure 1 represents a vertical section of a condensing and cooling means or apparatus constructed in accordance with the invention and as applied to a vacuum-pan, such as used in manufacturing sugar; and Fig. 2 is a vertical section, upon the line $x\ x$, of the cooler used in said apparatus.

A is a vacuum-pan, and B a condenser, with which the pan A connects by a vapor-pipe, $b$, and which is connected by a pipe, $c$, with any suitable exhausting pump or apparatus. C is a tank or reservoir, from which the water is taken to supply the condensing-chamber B by a pipe, $d$, and the cooler D by a pipe, $e$. This cooler, which is arranged below the condensing-chamber, consists of a series of serpentine passages or coiled pipes, $f$, arranged in a barometric column of the condenser by causing said pipes, which are contained within a vat or tank, $g$, to connect at their upper ends—as, for instance, by an upper cross-duct, $h$—with the lower end of the condensing-chamber B, and by a lower cross-duct, $i$, with a barometric leg, $k$, that dips into a cold well, E, arranged at a suitable distance below the condensing-chamber to make the barometric column effective.

G is a well, or it may be any other source of supply, from which the tank C is furnished with water by a pump and pipe, $l$.

H is a receiver for the overflow-water from the tank $g$ of the cooler, which overflow serves to keep up a circulation in the cooler. This receiver is provided with a spraying or perforated plate, $m$, onto which the overflow-water from the tank $g$ passes, and down through which it is distributed in a spray, and is met or permeated by a blast of cooling-air from a fan or blower, I, and ultimately is returned, through a lower perforated plate, $n$, and pipe $o$, to the well G. The cold well E also has an overflow-pipe, $r$, leading to the well G.

The condensing and cooling means or apparatus, as described, not only provides for both the water of condensation and the water used to effect the condensation of the vapor being discharged into the well E of the barometric column, and from thence being passed off by the overflow-pipe $r$ into the well G or other source of supply for the condensing and cooling water, but the water of condensation and the water used to effect condensation of the vapor are retarded by the vacuum in the vacuum-pan, and have a prolonged and divided circulation through the series of coiled pipes $f$ of the cooler D, and by the cooling effect of the water in the tank of said cooler are passed off to the well E in a cool state, thus making said well a cold one instead of, as in other condensers having barometric columns, a hot one. This provides for the water of condensation and the water used to effect condensation being returned to the well G or source of supply at a low temperature, for use over again for condensing and cooling purposes. Furthermore, the same tank C serves alike to supply the condensing-chamber B and the tank $g$ of the cooler with water. Again, not only is the water in the tank $g$, after having absorbed the heat from the water of condensation and the condensing-water circulating within the cooler, returned to the well G for use over again, but it is returned in a cool state by reason of the blast or current of air introduced within the spraying-receiver H, and caused to permeate or circulate between the sprayed particles of the overflow-water from the tank $g$ of the cooler, said air, which may, if desired, be chemically treated, carrying off the heat absorbed by it through the top of the receiver, which is open. Thus all the water used is returned at a low temperature to the well G, and the air-blast introduced within the receiver H has an important effect in producing this result. Furthermore, no water is lost or wasted, but there is a constant accumulation of cold water to the well G, including the water of condensation, the water used to effect condensation, and the water used in the cooler.

Under certain conditions a still may be substituted for the vacuum-pan.

I am aware that it is not broadly new to employ a vertical column or pipe provided at its upper end with a serpentine or coiled pipe which is arranged within a tank or vessel containing ice-water or other refrigerating substance for converting the vapor in the coil into liquid, and such I disclaim, as it is not my invention, which consists, as hereinbefore stated, of the combination of a condenser, a barometric leg leading therefrom, and serpentine passages or coiled pipes forming part of the barometric leg and arranged within a cooling-tank.

I claim—

1. The combination, with a condenser, of a barometric leg or column, through which water is discharged from said condenser, and one or more serpentine passages or coiled pipes forming part of said barometric leg or column, and arranged within a vat, tank, or vessel which is supplied with a cooling-fluid, substantially as and for the purpose specified.

2. The combination, with a condenser, of a barometric leg or column formed or provided with a series of serpentine passages or coiled pipes for retarding and cooling the water passing down said leg or column, substantially as and for the purpose specified.

THOS. GANNON.

Witnesses:
FREDK. HAYNES,
T. J. KEANE.